May 24, 1932.  B. LORMÜLLER  1,859,708
CONTROL OF BRAKING APPLIANCES OF MOTOR DRIVEN VEHICLES
Filed Oct. 24, 1930  2 Sheets-Sheet 1
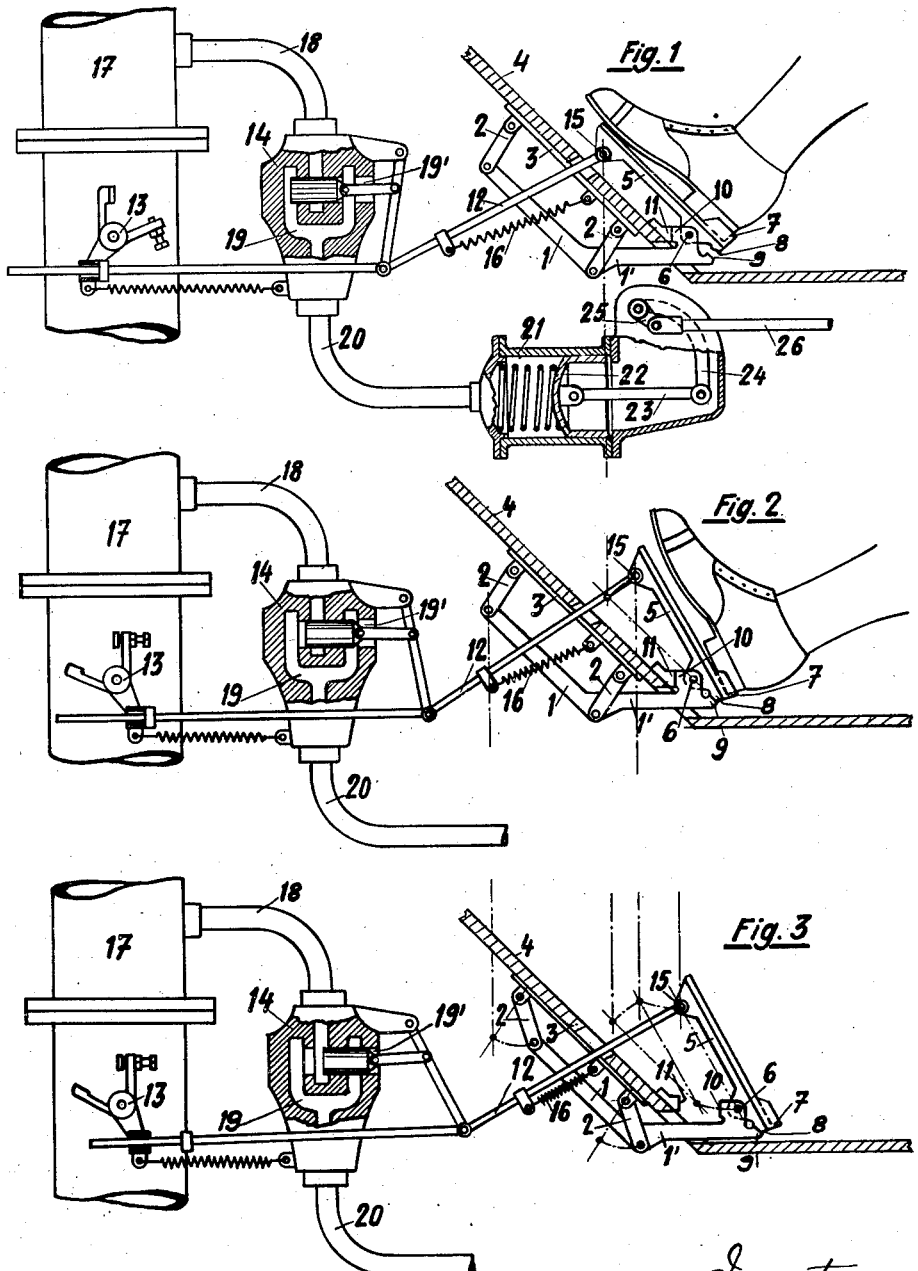

May 24, 1932.  B. LORMÜLLER  1,859,708
CONTROL OF BRAKING APPLIANCES OF MOTOR DRIVEN VEHICLES
Filed Oct. 24, 1930   2 Sheets-Sheet 2
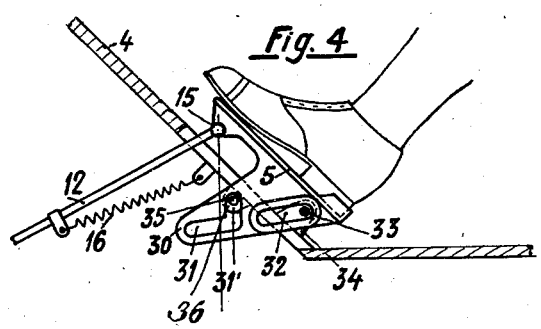
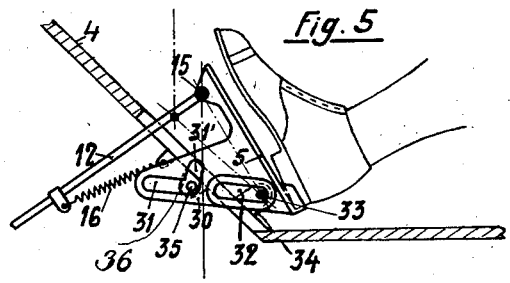
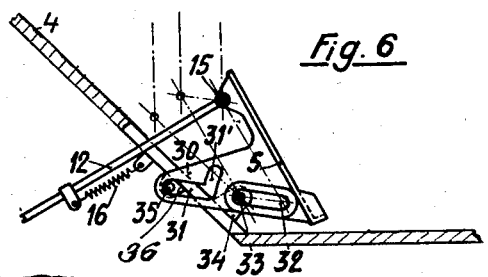
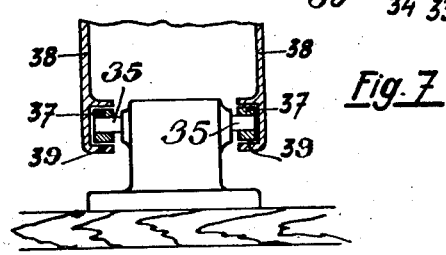

Patented May 24, 1932

1,859,708

UNITED STATES PATENT OFFICE

BERNHARD LORMÜLLER, OF ZURICH, SWITZERLAND

CONTROL OF BRAKING APPLIANCES OF MOTOR DRIVEN VEHICLES

Application filed October 24, 1930, Serial No. 491,037, and in Switzerland October 31, 1929.

This invention relates to a device for controlling auxiliary power braking appliances of motor driven vehicles, whereby the connecting or disconnecting of a source of power for actuating the brakes is effected by the aid of a gas pedal and by the movement of the latter beyond its closing position.

The object of the present invention is to ensure a convenient actuation of the throttle as well as of the brake by means of the driver's foot, whereby the two actuating positions as well as an intermediate position in which the gas supply is still cut off and the brake is not yet applied can be distinctly ascertained.

According to the present invention this is obtained in that a gas pedal is provided which consists of two parts, one of which is movably mounted whilst the other part serving as a foot rest is linked to the first part and displaceable relatively thereto in order to permit to selectively move the actuating rod connected to the foot rest over its whole effective displacement up to the full open position of the throttle by depressing the first part by means of the sole of the shoe or to move the rod up to the intermediate position by depressing with the heel only.

Constructional examples of the subject matter of the present invention are illustrated on the accompanying drawings, in which Fig. 1 is a side elevational view showing the position of the braking and accelerating device, when the throttle is open and the brake is released.

Fig. 2 is a side elevational view, showing the position of the braking and accelerating device, when the throttle is closed and the brake is released.

Fig. 3 is a side elevational view, showing the position of the braking and accelerating device, when the throttle is closed and the brake is set.

Fig. 4 is a side elevational view of a modified form of braking and accelerating device when in a position corresponding to Fig. 1.

Fig. 5 is a side elevational view of a modified form of braking and accelerating device when in a position corresponding to Fig. 2.

Fig. 6 is a side elevational view of a modified form of braking and accelerating device when in a position corresponding to Fig. 3.

Fig. 7 is a section of a detail modification.

Referring now to the first constructional example illustrated in Figs. 1–3, 1 denotes the first part of the device forming the subject matter of the present invention mounted by means of parallel links 2 to a plate 3 fixed to the under side of the foot board 4 of a motor car. The part 1 has an approximately horizontal extension 1' passing through the foot board. On the extension 1' the second part 5 of the device is turnably mounted at 6. The part 5 is shaped as a plate and forms a foot rest and is provided with a rim 7 against which the heel of the driver's shoe rests. The fulcrum 6 is at some distance from the end of the heel towards the sole, so that pressure on the heel will cause a turning of the part 5 relatively to the part 1 about the fulcrum 6. This turning motion is limited by the abutment facings 8 and 9 on the part 5 and on the extension 1' respectively. A pressure of the whole foot causes the part 1 to swing on its links 2 and the extension 1' to move in a substantially horizontal direction. This movement is limited by the abutment facings 10 and 11 (Fig. 3).

The rod 12 for actuating the throttle lever 13 and a distributing valve 14 is linked at 15 to the part 5. A tension spring 16 tends to move the rod 12 towards the right in Fig. 1 and to close thereby the throttle and the valve 14. 17 denotes the suction pipe of the motor and a pipe 18 leads from the suction pipe 17 to the piston valve 14. The space 19 of the valve casing is connected by a pipe 20 to a cylinder 21, the piston 22 of which operates under the action of the suction pressure by the intermediary of link 23, levers 24 and 25 and rod 26 the brakes which are not illustrated and which may be of any conventional design. 19' is a port for admitting air to the valve space 19.

The operation of the device is as follows:

Fig. 1 shows the parts in the driving position in which the rod 12 is displaced as far as possible and the device depressed until the facings 10 and 11 contact with each other. In this position the throttle is full open and the piston valve 14 is so far moved towards the left in Fig. 1 that air is admitted to the valve space 19 through the opening 19' and from there to the cylinder 21. The piston 22 is in its extreme position to the right and the brakes are inoperative.

Fig. 2 shows the intermediate position in which the sole of the shoe has been lifted off whereupon the spring 16 has caused a shifting of the rod 12 towards the right and a turning of the part 5 on its fulcrum 6 so far that the throttle is closed and the gas supply is cut off. As may be seen from Fig. 2 the vacuum pipe 18 is still cut off the space 19 of the valve by the valve piston and the brakes are still inoperative. In this determined position the facings 8 and 9 contact with each other.

In order to apply the brakes the heel of the shoe is lifted off the part 5 whereby the parts 1 and 5 move into the position shown in Fig. 3 in which the rod 12 is at its maximum displacement towards the right. The piston of the piston valve has also been displaced towards the right to close the opening 19' and the cylinder 21 is connected to the suction pressure, the piston 22 moves towards the left and the brake rod 26 is pulled and applies the brakes. By depressing the heel only the breaking action may be varied at will between the maximum action obtained with the parts in the position shown in Fig. 3 and no braking action in Fig. 2.

The constructional example illustrated in Figs. 4–6 differs from that shown in Figs. 1–3 in as much as the two parts 1 and 5 which are turnably connected to each other in the latter example are forming a unitary structure in Figs. 4–6.

The foot rest 5 to which the rod 12 is connected at 15 is provided with a web 30 having two parallel slots 31 and 32. A pin 33 mounted in a bracket 34 fixed to the upper side of the foot board passes through the slot 32 and the slot 31 has an extension 31' curved as an arc about the axis of the pin 33 as centre. A pin 35 mounted in a bracket 36 fixed to the underside of the foot board 4 passes through the slot 31, 31'.

The operation of this constructional example is similar to that described above with reference to Figs. 1–3, Fig. 4 shows the device in the driving position when the plate 5 is depressed by the foot until the pins 33 and 35 abut against the ends of the slots 32 and 31' respectively. The rod 12 is displaced towards the left in Fig. 4 and the throttle is full open and the distributing valve admits air to the cylinder.

Fig. 5 shows the parts in the intermediate position in which the lifting of the sole has caused a turning motion of the plate 5 and the web 30 about the pin 33 until the pin 35 rests on the lower wall of the groove 31. This is again a well determined position in which the gas supply is cut off and the braking action has not yet started. When the heel is lifted the device is shifted in the direction of the grooves 31, 32 up to the position shown in Fig. 6 in which the maximum braking effect is obtained and the pins 33 and 35 abut against the inner ends of the grooves 32 and 31 respectively.

Fig. 7 is a detail modification of the example illustrated in Figs. 4–6 in which instead of the slots grooves 39 are provided with which rollers 37 cooperate, the latter corresponding to the pins 33 or 35 of Figs. 4–6 and instead of one web 30 two webs 38 are provided.

I claim:

1. In an auxiliary power braking arrangement, in combination, a throttle, a valve for controlling said auxiliary power, a rod operatively connected to said throttle and to said valve for operating both, a foot rest to which said rod is linked, means for turnably mounting said foot rest on the foot board of a motor car, abutment means for limiting said turning motion of said foot rest, means adapted to permit a parallel displacement of said foot rest, abutment means for limiting said parallel movement of said foot rest, and spring means for returning said foot rest into the position of its maximum angular and parallel displacement.

2. In an auxiliary power braking arrangement, in combination, a throttle, a valve for controlling said auxiliary power, a rod operatively connected to said throttle and to said valve for operating both, a first part mounted on the foot board of a motor car to be parallel displaceable, abutment means for limiting said parallel displacement movement, a second part shaped as a plate adapted to form a support for the driver's shoe and being provided with a rim to secure the heel of the shoe in position, said plate being turnably mounted on the said first part and said rod being linked to said plate and abutment means for limiting the turning motion of said first part relatively to said second.

3. In an auxiliary power braking arrangement, in combination, a throttle, a valve for controlling said auxiliary power, a rod operatively connected to said throttle and to said valve for operating both, a support mounted by means of parallel links to the foot board of a motor car and being parallel displaceable, said support having an approximately horizontal extension, abutment means for limiting said parallel displacement movement of said support, a plate shaped as a foot rest for driver's shoe and provided with a rim to secure the heel of the shoe in position, said plate being turnably mounted on said extension of said support, said rod being connected to said plate, abutment means for limiting the turning motion of said plate relatively to said extension, and spring means for returning said foot rest into the position of its maximum angular and parallel displacement.

In testimony whereof I have signed my name to this specification.

BERNHARD LORMÜLLER.